US006971004B1

(12) United States Patent
Pleis et al.

(10) Patent No.: US 6,971,004 B1
(45) Date of Patent: Nov. 29, 2005

(54) SYSTEM AND METHOD OF DYNAMICALLY RECONFIGURING A PROGRAMMABLE INTEGRATED CIRCUIT

(75) Inventors: Matthew A. Pleis, Carnation, WA (US); Kenneth Y. Ogami, Bothell, WA (US); Warren Snyder, Snohomish, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 357 days.

(21) Appl. No.: 09/989,817

(22) Filed: Nov. 19, 2001

(51) Int. Cl.[7] ............................................. G06F 13/00
(52) U.S. Cl. ........................ 713/100; 326/38; 326/39; 326/41; 365/211; 702/120
(58) Field of Search ........................ 713/100; 326/38, 326/39, 41; 365/211; 702/120

(56) References Cited

U.S. PATENT DOCUMENTS

| 5,646,544 A | * | 7/1997 | Iadanza ........................ 326/38 |
| 6,198,303 B1 | * | 3/2001 | Rangasayee ................. 326/38 |
| 6,460,172 B1 | * | 10/2002 | Insenser Farre et al. ...... 716/17 |
| 6,542,844 B1 | * | 4/2003 | Hanna ......................... 702/120 |
| 6,661,724 B1 | * | 12/2003 | Snyder et al. ............... 365/211 |
| 6,686,860 B2 | * | 2/2004 | Gulati et al. ................. 341/155 |
| 6,724,220 B1 | * | 4/2004 | Snyder et al. ................ 326/39 |

* cited by examiner

Primary Examiner—A. Elamin
(74) Attorney, Agent, or Firm—Wagner, Murabito & Hao LLP

(57) ABSTRACT

The present invention system and method enables dynamic reconfiguration of an electronic device in a convenient and efficient manner. In one embodiment, the electronic device includes a microprocessor, a plurality of internal peripherals, an interconnecting component, an external coupling port, and a memory for storing instructions. The plurality of internal peripherals, the interconnecting component and the external coupling port are programmably configurable to perform a variety of functions. The memory stores a plurality of configuration images that define the configuration and functionality of the plurality of internal peripherals, the interconnecting component and the external coupling port. The instructions stored by the memory facilitate dynamic reconfiguration of the electronic device. Based upon the existence of a predetermined condition, the electronic device is automatically reconfigured by activating different configuration images.

18 Claims, 5 Drawing Sheets

SYSTEM AND METHOD OF DYNAMICALLY RECONFIGURING A PROGRAMMABLE INTEGRATED CIRCUIT

RELATED APPLICATIONS

This application claims the benefit of co-pending commonly-owned U.S. patent application Ser. No. 10/033,027, filed Oct. 22, 2001, entitled "PROGRAMMABLE MICROCONTROLLER ARCHITECTURE," which is hereby incorporated by this reference.

FIELD OF THE INVENTION

Embodiments of the present invention generally relate to the field of integrated circuit chips. More specifically, embodiments of the present invention pertain to a system and method for dynamically reconfiguring a programmable integrated circuit.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to provide these benefits often include integrated circuits on a single substrate that provide a variety advantages over discrete component circuits. However, traditional design and manufacturing approaches for integrated circuits are often very complex and consume significant resources.

Electronic systems often rely upon a variety of components included in integrated circuits to provide numerous functions. Microcontrollers are one example of integrated circuit components with characteristics that are potentially useful in a variety of applications. For example, microcontrollers are typically reliable and relatively economical to produce. Microcontrollers have evolved since they were first introduced and have substantially replaced mechanical and electromechanical components in numerous applications and devices. However, while traditional mircontrollers have some characteristics that are advantageous they also tend to be limited in the number of applications in which any given microcontroller can be utilized.

Traditionally each microcontroller was custom designed precisely for a narrow range of applications with a fixed combination of required peripheral functionalities. Developing custom microcontroller designs with particular fixed peripherals is time and resource intensive, typically requiring separate and dedicated manufacturing operations for each different microcontroller (which is particularly expensive for small volume batches). Even if a microcontroller may suffice for more than one application, it is still difficult to select an appropriate microcontroller for a particular application. Determining which one of the different available particular microcontroller designs is best suited for a particular application is challenging. In addition, the unique aspects of the intended application often make it difficult to find an optimum microcontroller, usually necessitating a compromise between the convenience of using an existing microcontroller design and less than optimum performance. Even when a suitable microcontroller is found, subsequent changes to the application and new requirements placed on the application can lead to the need for a totally different microcontroller.

Application specific integrated circuits (ASICs) may appear to address some of the issues associated with finding a suitable microcontroller for a particular application, but they tend to present significant hurdles. ASICs can be problematic because they tend to require a sophisticated amount of design expertise and the obstacles of long development times, high costs, and large volume requirements still remain. To the extent some flexibility may be provided by the inclusion of gate arrays or other logic devices, the traditional approaches remain expensive and require a sophisticated level of design expertise. In addition traditional integrated circuit configurations and functionality are typically set during initial manufacture and are not readily adaptable to changing conditions in the field.

Traditional integrated circuits typically have a predetermined set configuration and functionality that do not conveniently facilitate dynamic changes, including those systems that may provide minimal flexibility at great expense. Typically, one set of components are included and set to perform a single function and a second set of components are required to perform another function. Most applications require the performance of a variety of different functions resulting in significantly increased resource commitments. Providing components dedicated to single functions often results in under utilization of those dedicated components. For example, numerous functions in a variety of applications are performed infrequently or intermittently and the valuable resources committed to these activities sit idle. In addition, applications often require functions to be performed sequentially with second group of components dedicated to later activities sitting idle waiting on input from a first group of components dedicated to earlier activities and when the first group of components has finished they sit idle while the second group performs their dedicated function.

Similarly, the purpose of particular external ports or pins are rigidly set and traditional systems typically dedicate external ports or pins to very precise purposes. Accomplishing additional or different interactions with external components typically requires additional dedicated external ports or pins which consume valuable resources that are typically limited. The dedicated external ports or pins are also usually utilized infrequently and/or required to wait while activities proceed via other external ports or pins.

What is required is a system and method of dynamically reconfiguring a programmable integrated circuit in a convenient and efficient manner.

SUMMARY

The present invention is a system and method providing dynamic programmability of an electronic device (e.g., a programmable integrated circuit) in a convenient and efficient manner. In one embodiment of the present invention, the dynamic programmability enables operationally smooth (e.g., "on the fly") changes in the configuration and/or functionality of the electronic device with minimal or no disruptions to device operations. In one exemplary embodiment, the present invention is implemented in an integrated microcontroller with components that are dynamically programmable to provide different configurations and functions. A plurality of different configuration images are utilized to define the different configurations and functions and facilitate allocation of programmable components included in the electronic device accordingly.

In one embodiment, the present invention is implemented in a microcontroller included on a single substrate. The microcontroller includes a microprocessor, a plurality of internal peripherals, an interconnecting component, an external coupling port, and a memory for storing instructions. The microprocessor processes information. The plurality of internal peripherals are programmably configurable to perform a variety of functions associated with the microcontroller. The interconnecting component is programmably configurable for selectively interconnecting the plurality of internal peripherals and other internal microcontroller components. The external coupling port is programmably configurable to implement different connectability states by which the electronic system is connectable to an external device. The memory stores instructions and data (e.g., a configuration image) directed at setting the configurations and functions allocated to the plurality of internal peripherals, the interconnecting component and the external coupling port.

In one embodiment of the present invention, the configuration and functionality of an electronic device is defined by a configuration image loaded in a memory of the electronic device. The configuration image includes instructions and data for implementing the configuration and functions. In one embodiment, a plurality of configuration images facilitate dynamic reconfiguration of a programmable integrated circuit (e.g., a PSOC™ microcontroller, available from Cypress MicroSystems, Bothell, Wash.). In one exemplary implementation of the present invention, a configuration image includes user module personalization data (e.g., a configuration table), module parameterization data, application program interface (API) data and user program code. Based upon the existence of a predetermined condition, the integrated circuit is automatically reconfigured by activating different configuration images. In one embodiment, activating different configuration images results in different values being loaded in configuration registers of functional circuit blocks included in the integrated circuit.

DRAWINGS

DETAILED DESCRIPTION OF THE INVENTION

Figure 1:
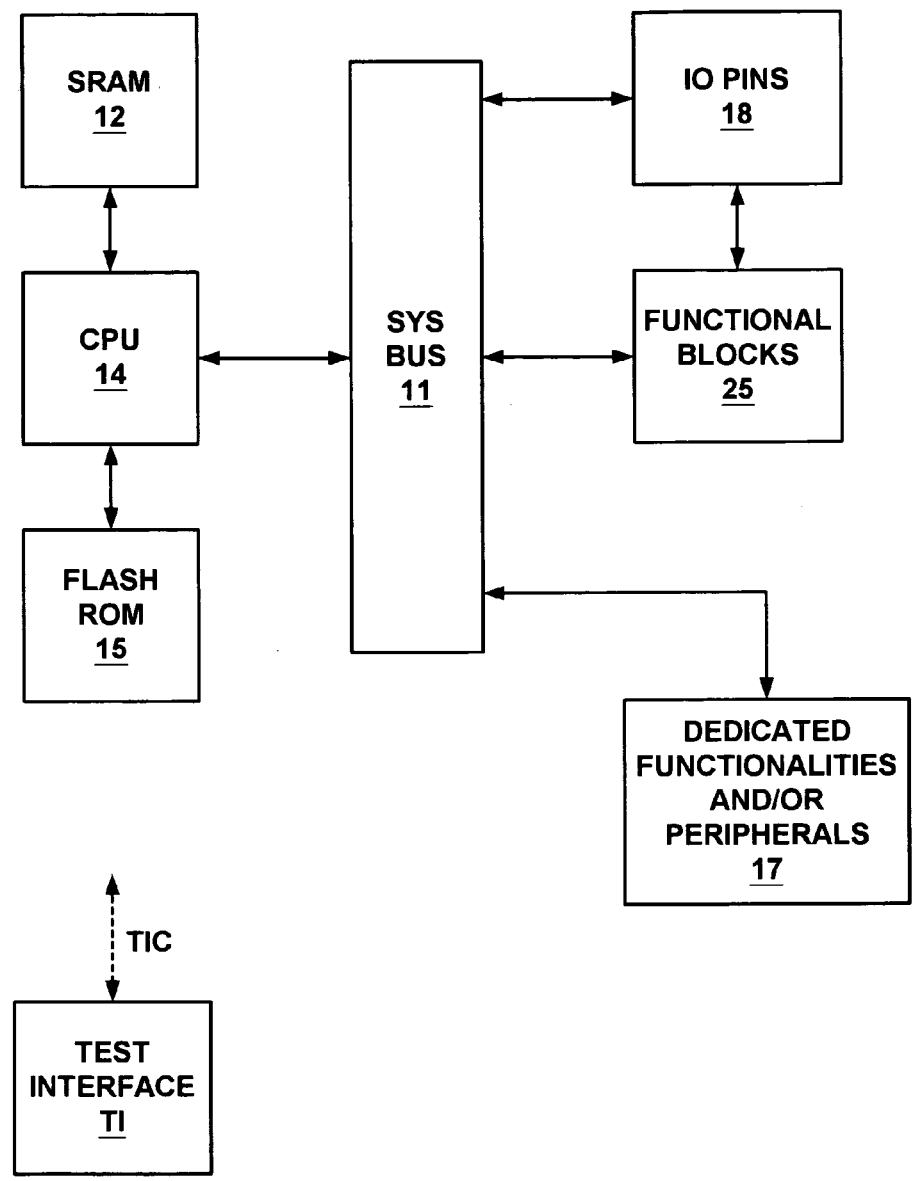
FIG. 1 is a block diagram showing a high level view of an exemplary integrated circuit (e.g., a microcontroller) upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention is a system and method of dynamically programming an integrated circuit. In one embodiment of the present invention, a system integrated on a single substrate is dynamically programmable to provide a plurality of configurations and functionalities. In one exemplary implementation of the present invention, a plurality of configuration images defining different configurations and functionalities of a programmable integrated circuit are stored in a memory included in the programmable integrated circuit. The configuration image data may be generated and loaded on the programmable integrated circuit in various manners including by an electronic device design tool. In one embodiment, the electronic device design tool comprises a configuration interface for defining user module personalization and parameterization, an automated code generator for generating source code (e.g., application program interface code), a source code editing interface for editing the automatically generated code, and a debugging interface for assisting debugging operations through emulation of the target device. The exemplary embodiments described herein (e.g., a microcontroller) are not meant to limit the application of the present invention to any specific integrated circuit device or type (e.g., a microcontroller) and embodiments of the present invention may be implemented in a variety of integrated circuits.

FIG. 1 is a block diagram showing a high level view of an exemplary integrated circuit (e.g., a microcontroller) 10 upon which embodiments of the present invention may be implelmented. In one embodiment, integrated circuit 10 includes a communication bus 11, static random access memory (SRAM) 12, central processing unit (CPU) 14, flash read-only memory (ROM) 15, input/output (I/O) pin(s) 18 and functional component 25. Communication bus 11 is electrically coupled to static random access memory (SRAM) 12, central processing unit (CPU) 14, flash read-only memory (ROM) 15, input/output (I/O) pin(s) 18 and functional component 25. Static random access memory (SRAM) 12 stores volatile or temporary data during firmware execution. Central processing unit (CPU) 14 processes information and instructions. Flash read-only memory (ROM) 15 stores information and instructions (e.g., firmware). In one embodiment of the present invention, flash read-only memory (ROM) 15 stores configuration image data. Input/output (I/O) pin(s) 18 provides an interface with external devices (not shown). Functional component 25 is programmable to provide different functions and configurations.

It is appreciated that integrated circuit 10 is readily adaptable to include a variety of other components. In one exemplary implementation, integrated circuit 10 also includes a dedicated functionality internal peripheral component 17 which is coupled to system bus 11 in addition to the functional component 25. An optional test interface (TI) may be coupled to integrated circuit 10 via a test interface coupler (TIC), which may be detachable, to perform debugging operations during startup and initialization of the integrated circuit. In one embodiment of the present invention, additional functions such as clocking and power control are provided by a variety of components including a precision oscillator and phase locked loop (PLL), a voltage reference, a 32 kHz crystal oscillator (which may be utilized for a variety of applications such as calibration and synchronization, etc.), an interrupt controller (for generating interrupt signals as required), a power on reset control unit (for performing functions related to power supply stability), and a brown-out detection unit (which detects substandard, subnominal power system parameters).

Figure 2A:
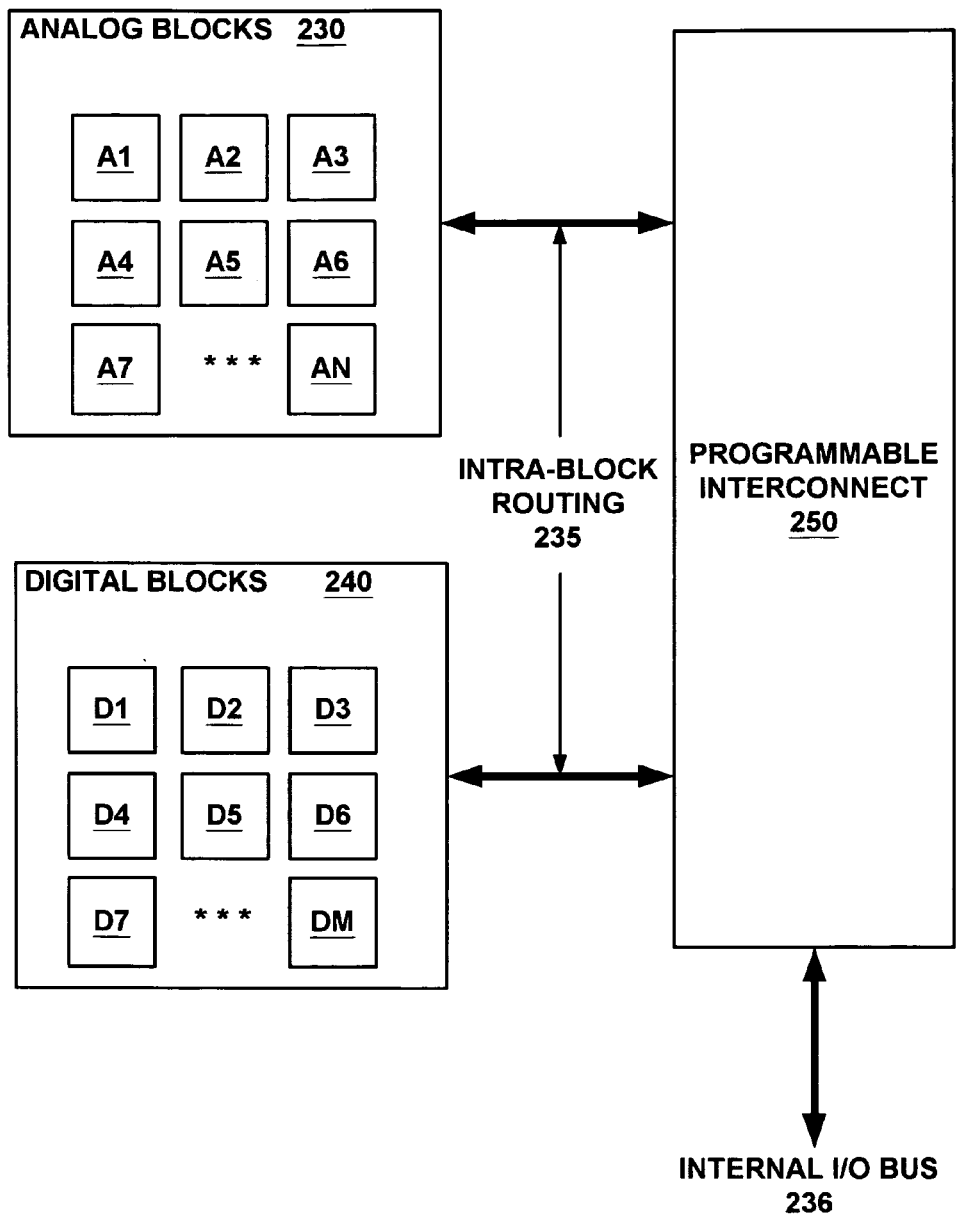
FIG. 2A is a block diagram of one embodiment of a functional component depicted in greater detail.

Referring to FIG. 2A, an embodiment of functional component 25 is depicted in greater detail. In this embodiment, functional component 25 includes an analog functional block 230, a digital functional block 240, and a programmable interconnect 250. In one exemplary implementation, analog functional block 230 includes a matrix of interconnected analog functional blocks A1 through AN. The number N may be any number of analog functional blocks. Likewise, digital block 240 includes a matrix of interconnected digital functional blocks D1 through DM. The number M may be any number of digital functional blocks.

The analog functional blocks A1 through AN and the digital functional blocks D1 through DM are fundamental building blocks (e.g., fundamental circuits) that may be combined in a variety of configurations to accomplish a variety of functions. The functional blocks are programmably configurable to perform different functions. In the present embodiment, the functional blocks include elements with changeable characteristics that can be specified according to the function to be performed. Inputs received by a functional block are directed through and manipulated by the functional block according to the specified characteristics of the elements. A combination of functional blocks and the characteristics of their elements can be dynamically programmed to perform a desired function. Importantly, different combinations of blocks producing different functions, may exist at different times within the same system. For example, a set of functional blocks configured to perform the function of analog-to-digital conversion may sample a signal. After processing that signal in the digital domain, some or all of those same blocks (perhaps in conjunction with others) may be recombined in a different configuration to perform the function of digital-to-analog conversion to produce an output signal.

The present invention is readily adaptable for use with numerous functional blocks that are programmably configurable to provide a variety of functions. Exemplary functional peripherals include timers, controllers, serial communications units, Cycle Redundancy Check (CRC) generators, Universal Asynchronous Receiver/Transmitters (UARTs), amplifiers, programmable gain components, digital to analog converters, analog to digital converters, analog drivers, and various filters (e.g., high-, low-, and band-pass). In one exemplary implementation higher order user modules (e.g., modems, complex motor control, sensor devices, etc.) are created with combinations of functional blocks. Co-pending commonly-owned incorporated U.S. patent application Ser. No. 10/033,027, filed Oct. 22, 2001, entitled "PROGRAMMABLE MICROCONTROLLER ARCHITECTURE," includes additional details on exemplary implementations of present invention integrated circuits (e.g., integrated circuit 10) and functional components (e.g., functional component 25).

In one embodiment of the present invention, the programmable configuration of integrated circuit 10 components is facilitated by memory (e.g., configuration registers) included in the integrated circuit. In one exemplary implementation of the present invention, the memory includes configuration registers that store a series of logical values (e.g., logical 1 or 0 corresponding to a predetermined voltage level) corresponding to a particular configuration and/or function for an integrated circuit 10 functional block. The series of logic values are programmably configurable and in one embodiment of the present invention the logical values loaded in a configuration register are defined by a configuration image (e.g., stored in a system memory 17).

In one embodiment of the present invention, a functional component (e.g., functional component 25) includes registers that are programmably configurable to store configuration data that defines the combination (e.g., electrical coupling) of the functional blocks and the characteristics (e.g., parameters) of the respective functional block elements. When a value is changed in a configuration register, the configuration and/or functionality of a corresponding integrated system 10 component is changed accordingly. In one exemplary implementation of the present invention, some functional blocks are configured to affect autonomous system operations, such as interrupts.

Figure 2B:
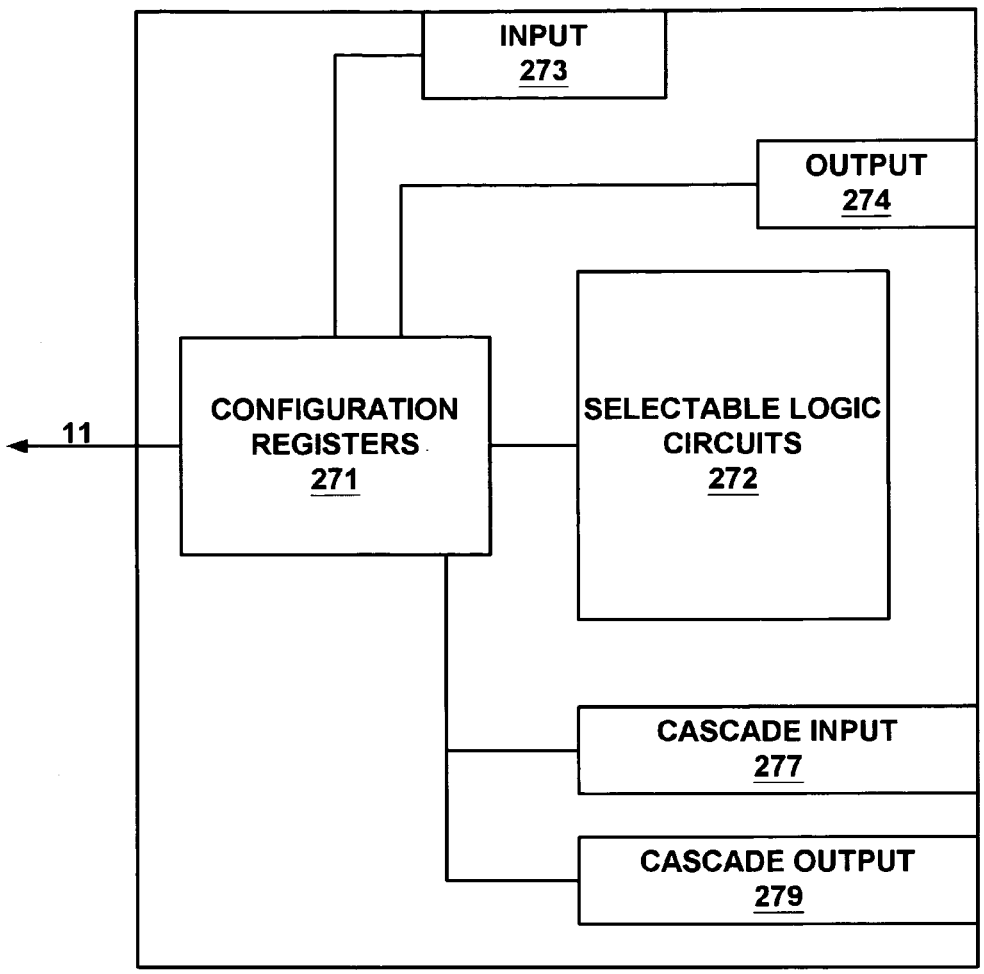
FIG. 2B is a block diagram of one embodiment of a functional block, included in one exemplary implementation of a present invention functional block.

FIG. 2B is a block diagram of functional block 270, one embodiment of a present invention functional block (e.g., A1, D1, etc.). Functional block 270 comprises configuration register(s) 271, selectable logic circuits 272, input 273, output 274, cascade input 277, and cascade output 279. Configuration register(s) 271 is coupled to selectable logic circuits 272, input 273, output 274, cascade input 277, and cascade output 279. Configuration register(s) 271 stores configuration data that defines the configuration and functionality of the other components of functional block 270.

Selectable logic circuits 272 are circuit components that provide a variety of functions in accordance with the configuration data stored in configuration register(s) 271. Input 273 and output 274 provide inputs and outputs respectively to other components of integrated circuit 10 in accordance with the configuration data stored in configuration register(s) 271. Cascade input 277 and cascade output 279 provide inputs and outputs respectively to other cascaded functional blocks in accordance with the configuration data stored in configuration register(s) 271. In one embodiment there are four configuration registers per block, with a capacity of eight bits per register.

A hierarchy of programmable interconnectivity is implemented within system 10. Continuing with reference to FIG. 2A, each individual functional block or unit (e.g., analog blocks A1 through AN and digital blocks D1 through DM) may communicate and interact with each and/or any other functional block or unit and/or communication bus 11. Analog functional blocks 230 and digital functional blocks 240 are communicatively coupled to programmable interconnect 250 by intra-block routing 235 in the present exemplary embodiment. Which functional unit communicates with which other functional unit and/or communication bus 11 is programmably configurable via the programmable interconnect 250 in the present exemplary embodiment. In one exemplary implementation of the present invention, analog functional blocks 230 and digital blocks 240 include internal matrices that facilitate coupling of signals between the function blocks in accordance with programmed configuration data.

In the present exemplary embodiment, programmable interconnect 250 comprises a configuration system and a global mapping system. The configuration system is coupled to communication bus 11 and the global mapping system, which in turn is coupled to functional component 25. The configuration system is programmably configurable to selectively couple with communication bus 11 and/or the global mapping system. The global mapping system facilitates selective coupling of functional blocks included in functional component 25 to other functional blocks and/or pin count of a pin-by-pin configurable I/O port (e.g., I/O pin(s) 18) may vary from one application to another, depending on the system device under consideration. An I/O routing modality incorporating features of the present embodiment enables flexibly configurable I/O ports to establish a specific pin locale or pin for the conveyance of particular external signals (e.g., to or from an external device) on pin by pin basis, greatly enhancing user convenience and system applicability.

In one embodiment of the present invention, programmable interconnect 250 includes configuration registers. The values in the configuration registers are utilized to establish electrically conductive paths between components of integrated circuit 10. In one exemplary implementation of the present invention the configuration registers facilitate electrical coupling of functional blocks to each other and to other components of integrated circuit 10 (e.g., processor 14).

In one embodiment of the present invention, which functional block and/or other components of integrated system 10 are electrically coupled to an I/O pin is configurably programmable via programmable interconnect 250. In the present exemplary implementation, programmable interconnect 250 is connected via an internal input/output (I/O) bus 236 to a configurable I/O port (e.g., I/O pin(s) 18 in FIG. 1). Each pin of the configurable I/O port is programmably configured on a pin by pin basis. For example, in a first configuration a first I/O port pin (e.g., I/O pin(s) 18) is configured to function as an input and a second I/O pin is configured to function as an output, and in a second configuration the first I/O port pin is configured to function as an output and the second I/O pin is configured to function as an input. The total pin count of a pin-by-pin configurable I/O port (e.g., I/O pin(s) 18) may vary from one application to another, depending on the system device under consideration. An I/O routing modality incorporating features of the present embodiment enables flexibly configurable I/O ports to establish a specific pin locale or pin for the conveyance of particular external signals (e.g., to or from an external device) on pin by pin basis, greatly enhancing user convenience and system applicability.

In one embodiment of the present invention, a system timing block is included to provide timing information used for synchronizing and otherwise effectuating interfacing between system functionalities (e.g., functional blocks). The system timing block like the functional component 25 is programmable. Advantageously, this allows the system timing block to generate a myriad of different time bases, as required for any particular application the system is being configured to effectuate. These time bases may be fed into analog functional blocks and digital functional blocks for use therein, via the programmable interconnect. Examples of analog functions requiring such time bases include conversions, modulations, and the like. One striking example of a digital function requiring such time bases a universal asynchronous receiver transmitter (UART) functionality.

In one embodiment of the present invention, the configuration and functionality of an electronic device (e.g., a programmable integrated circuit) is defined by a configuration image loaded in a memory of the electronic device (e.g., microcontroller 10). In one exemplary implementation of the present invention, a plurality of images are loaded in a memory of an electronic system to facilitate dynamic reconfiguration of the electronic system (e.g., a programmable integrated circuit). The information comprising the configuration image may be represented in varying degrees of abstraction. At a low level of abstraction the configuration image is represented by source code (e.g., assembly or machine language) stored as logical values (e.g., logical ones and zeroes) in a memory (e.g., in the programmable integrated circuit). At a higher lever of abstraction the configuration image is represented by textual definitions or graphical images (e.g., in a design tool).

In one exemplary implementation of the present invention, a configuration image includes user module personalization data (e.g., a configuration table), module parameterization data, application program interface (API) information and user program code. The user module personalization data includes information defining the functionality and configuration of a component included in a programmable integrated circuit (e.g., a functional block). The parameterization data defines parameters for the programmable component. The API defines an operation of the programmable component (e.g., apply power, remove power, sample rate of an AC to DC converter, etc.). In one embodiment of the present invention an API includes code for a function call (e.g., from a user program) and/or an interrupt. In one exemplary implementation of the present invention, user module personalization data defines an analog function block to function as an op amp, the parameterization data defines the gain of the op amp (e.g., 8×), and the API code defines a reset of the op-amp.

A dynamically programmable electronic device (e.g., a programmable integrated circuit) of the present invention is programmably configurable to perform a plurality of functions for a variety of applications. Each configuration image loaded in a present invention device enables the device to provide a different configuration and functionality. In one exemplary implementation, a present invention device is included in a wireless communication device (e.g., a walkie-talkie). When a transmission indication exists (e.g., a "talk" button is engaged) a first image loaded in the present invention device is activated (e.g., configuration registers are loaded in accordance with the first image) causing the components therein to perform as a transmitter and when a receiving indication exists (e.g., the talk button is not engaged) a second image loaded in the present invention device is activated causing the components therein to perform as a receiver. In another exemplary implementation, a present invention device is included in a vending machine. During normal operating hours a first image loaded in the present invention device causes the components therein to participate in normal vending operations (e.g., monitoring money collection, calculating change, controlling product dispensing, etc.) and at predetermined short durations a second image loaded in the present invention device causes the components therein to participate in inventory activities (e.g., calculating the totals of products sold, determining need for additional products, participating in modem operations to communicate with a central resource, etc.)

The present invention is readily adaptable to a variety of mechanisms and processes for implementing the dynamic activation of different configuration images. In one embodiment of the present invention, a first configuration image and a second configuration image include a copy of the same user program. In another embodiment, a first configuration image and a second configuration image include pointers that point to a user program and relevant information from the user program is loaded into the configuration registers when the respective image is activated.

Figure 3:
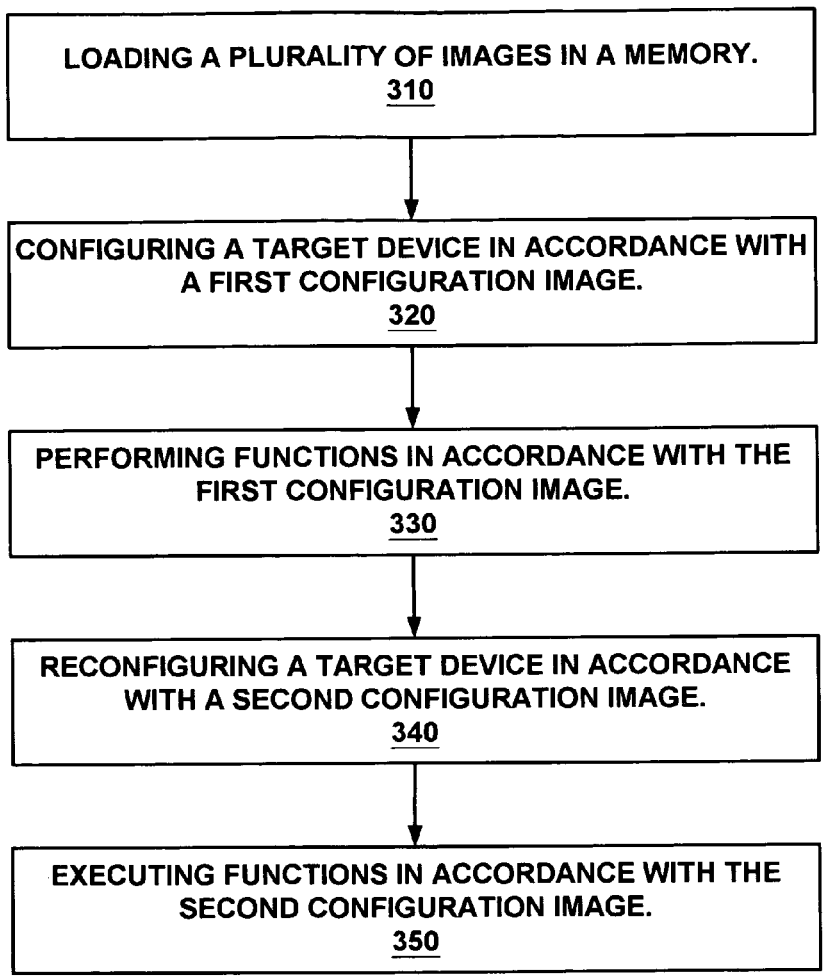
FIG. 3 is a flow chart of a dynamic configuration method, one embodiment of the present invention.

FIG. 3 is a flow chart of dynamic configuration method 300, one embodiment of the present invention. Dynamic configuration method 300 facilitates dynamic configuration of a programmable system to provide different configurations and functions. In one embodiment of the present invention, dynamic configuration method 300 utilizes a plurality of configuration images loaded in a system memory to facilitate different configurations and implement different functionalities. In one embodiment of the present invention, dynamic configuration method 300 facilitates configuration changes (e.g., reconfiguration) with smooth operational transitions ("on the fly") to efficiently and flexibly address differing functional or configuration requirements of end use applications. In one embodiment of the present invention, the configuration images are provided by a design tool (e.g., a computer implemented software design tool). Additional details on an exemplary implementation of a present invention design tool are set forth in co-pending commonly-owned U.S. patent application Ser. No. 09/989,570, filed Nov. 19, 2001 entitled "METHOD FOR FACILITATING MICROCONTROLLER PROGRAMMING", which is hereby incorporated by this reference, and U.S. patent application Ser. No. 09/989,819, filed Nov. 19, 2001 entitled "A SYSTEM AND METHOD FOR CREATING A BOOT FILE UTILIZING A BOOT TEMPLATE", which is also hereby incorporated by this reference.

In step 310 a plurality of configuration images are loaded in a memory. In one exemplary implementation of the present invention, different configuration images define different functions and configurations for components of a target device. In one embodiment of the present invention, two different configuration images include copies of the same user code and in an other embodiment of the present invention two different configuration images include a "call" to the same user code. In one embodiment of the present invention, each configuration image includes information associated with selections of user modules for each one of the plurality of configuration images, allocations of hardware resources of the device to the selected user modules, parameterizations for the selected user modules, and connections between the selected user modules and to other device components (e.g., external pins).

In step 320 a device is configured in accordance with a first configuration image. In one embodiment of the present invention, information from the first configuration image is automatically loaded into configuration registers in the target device. In one exemplary implementation, the first configuration image is automatically loaded into configuration registers in response to a first condition (e.g., a talk button is activated, at a particular time, etc.).

In step 330 functions are performed in accordance with a first configuration image. In one embodiment of the present invention, the first configuration image is associated with functions direct at normal or standard activities of a particular application. For example, a first image is associated with normal vending activities including monitoring money collection, calculating change, controlling product dispensing, etc.

In step 340 a device is reconfigured in accordance with a second configuration image. In one embodiment of the present invention, information from a second configuration image is automatically loaded into configuration registers in the target device and replaces the information associated with the first configuration image. In one exemplary implementation, the second configuration image is automatically loaded into configuration registers in response to a second condition (e.g., a talk button is not activated, at a different particular time, etc.).

In step 350 functions are executed in accordance with a second configuration image. In one embodiment of the present invention, the second configuration image is associated with functions directed at special activities of a particular application. For example, a second image is associated with special vending activities including calculating the totals of products sold, determining need for additional products, participating in modem operations to communicate with a central resource, etc.

Figure 4:
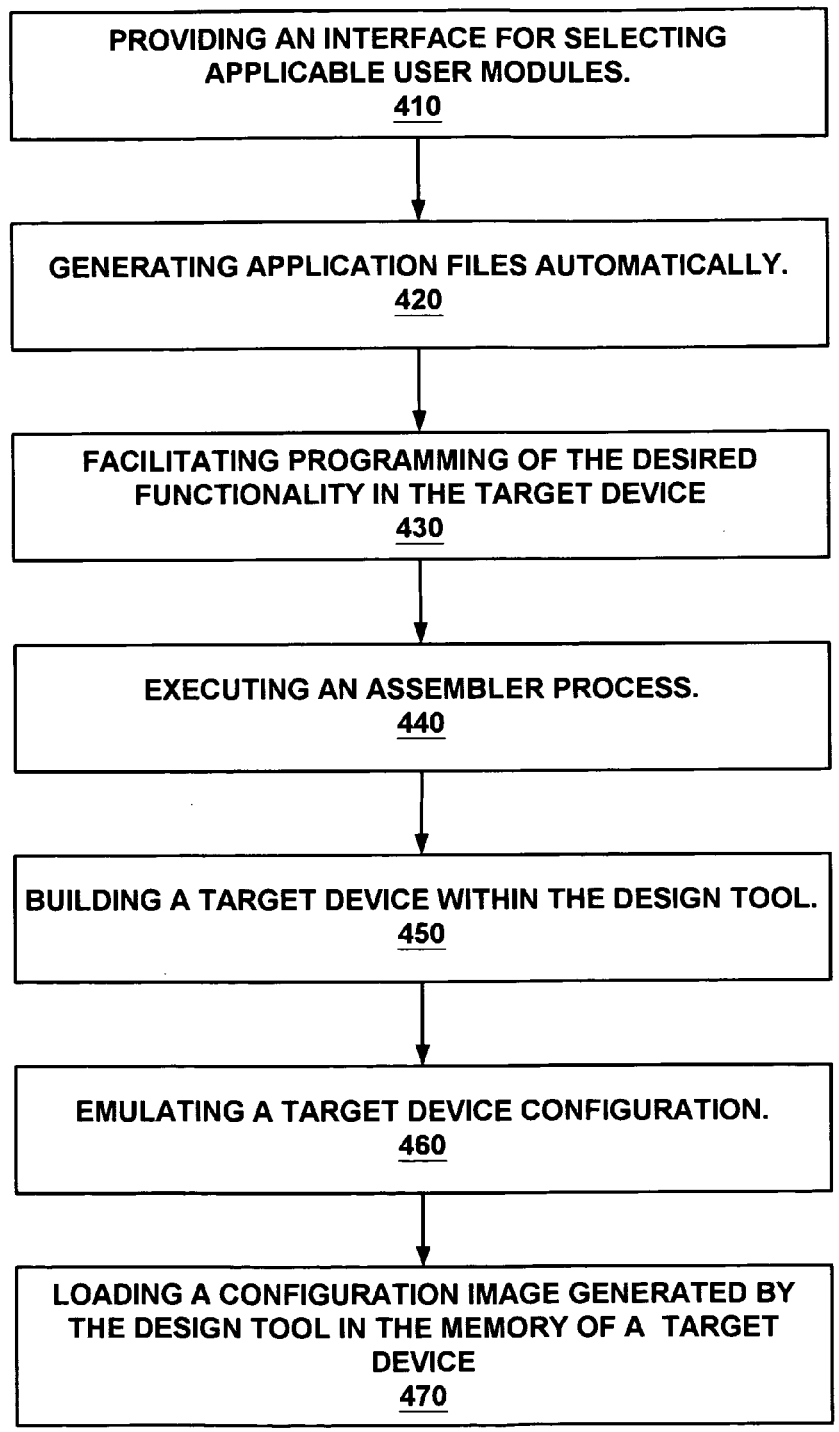
FIG. 4 is a flow chart of a design tool process illustrating exemplary steps used by a design tool in accordance with one embodiment of the present invention.

In one embodiment of the present invention, configuration images are provided by an electronic device design tool (e.g., an integrated circuit design tool). FIG. 4 is a flow chart of design tool process 400 and illustrates exemplary steps used by a design tool in accordance With one embodiment of the present invention. Design tool process 400 facilitates configuration, programming, building, emulation and debugging of a customized integrated circuit (a "target device"). In one exemplary implementation the integrated circuit is similar to integrated circuit 10 of FIG. 1 with a functional component 25 similar to FIG. 2A.

In one embodiment, design tool process 400 is carried out by a computer system under the control of computer-readable and computer-executable instructions directed at implementing design tool process 400. One embodiment of an exemplary computer system utilized to implement design tool process 400 is set forth in incorporated U.S. patent application Ser. No. 09/989,570, filed Nov. 19, 2001, entitled "METHOD FOR FACILITATING MICROCONTROLLER PROGRAMMING". The computer-readable and computer-executable instructions reside, for example, in data storage features of the computer system such as a computer usable volatile memory, computer-usable non-volatile memory and/or data storage device. The computer-readable and computer-executable instructions direct the computer system operation (e.g., a processor) in accordance with design tool process 400.

In step 410, an interface for user interaction is provided. In one embodiment of the present invention, the interface is provided for selecting applicable "user modules" (e.g., a preconfigured function that may be based on more than one functional block). In one exemplary implementation, a user module when programmed and loaded on a memory of the device directs a functional block to work as a peripheral on the target device. At any time in design tool process 400, user modules may be added to or removed from the target device. The selected user modules are associated with (e.g., "placed" or "mapped to") representations of functional blocks defined in the design tool. Once a user module is associated with a representation, its parameters can be viewed and modified as needed. Global parameters used by a plurality of user modules (for example, CPU clock speed) can also be set. In one embodiment of the present invention, interconnections between selected user modules are specified (e.g., either as each user module is placed or afterwards). The pin-out for each block can also be delineated, making a connection between the software configuration and the hardware of the target device.

In step 420, application files are automatically generated. When application files are generated, existing assembly-source and C compiler code are updated for device configurations. In one embodiment of the present invention application program interfaces (APIs) and interrupt service routines (ISRs) are generated.

In step 430, programming of the desired functionality into the target device is facilitated. In one embodiment of the present invention, source code files can be edited, added or removed. In one embodiment of the present invention, programmable configuration of external ports is also facilitated by design tool process 400.

In step 440, an assembler process is executed. The assembler operates on an assembly-language source to produce executable code. This code is compiled and built into an executable file. In one embodiment of the present invention, the executable file is downloaded into an emulator, where the functionality of the target device is emulated and debugged.

In step 450 the target device is "built" within the design tool. Building the target device in the design tool includes linking the programmed functionalities of the source files (including device configuration). In one exemplary implementation of the present invention, the linked programmed functionalities and the source files are downloaded to an emulator for debugging in step 450.

In step 460, the target device is emulated using an in-circuit emulator for debugging. The emulator allows the target device to be tested in a hardware environment while device activity is viewed and debugged in a software environment.

In step 470 a configuration image generated using design tool process 400 is loaded into memory of a target device. In one embodiment of the present invention a plurality of configuration images are loaded into memory of a target device.

Although specific steps are disclosed in design tool process 400 of FIG. 4, such steps are exemplary. That is, the present invention is well suited to use with various other steps or variations of the steps recited in process 400. Additionally, for purposes of clarity and brevity, the discussion is directed at times to specific examples. The present invention design tool process 400, however, is not limited solely to use to design a particular target device (e.g., an integrated circuit and/or microcontroller). Instead, the present invention is well suited to use with other types of computer-aided hardware and software design systems in which it may be necessary to accomplish a multitude of tasks as part of an overall process directed at designing an electronic device.

Thus, the present invention provides convenient and efficient dynamic configuration of an electronic device (e.g., an integrated circuit). An electronic device design of the present invention facilitates dynamic programmability that enables operationally smooth (e.g., "on the fly") changes in the configuration and/or functionality of the electronic device with minimal or no disruptions to device operations. The present invention allows utilization of the same components to perform different functions and take on different configurations that are capable of satisfying the requirements of different applications. A variety of functions and configurations may be implemented with less resources than traditional systems. The present invention does not require duplicative resources (e.g., circuit components) for dedication to the performance of different functions or configurations. A present invention dynamically programmable device design also facilitates utilization of device components that would otherwise be operationally idle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A circuit comprising:
   a bus for communicating data;
   a microprocessor for processing data, said microprocessor coupled to said bus;
   a programmable functional component coupled to said bus, wherein said programmable functional component includes a plurality of functional blocks programmable to provide a plurality of functions and configurations;
   a memory for storing data including information associated with said functions and configurations, wherein said information includes a plurality of configuration images that define the configuration and functionality of said circuit including user module personalization data for defining the functionality and configuration of a component included in said circuit, said memory coupled to said bus; and
   a programmably configurable external communication port for communicatively coupling with external devices relative to said circuit.

2. The circuit of claim 1, wherein said functional component includes:
   a programmable interconnect for coupling components to said bus;
   an analog functional block configurable to perform analog functions, said analog block coupled to said interconnect; and a digital functional block configurable to perform digital functions, said digital block coupled to said interconnect.

3. The circuit of claim 1, further comprising a test interface.

4. The circuit of claim 1, wherein said circuit is automatically reconfigured by activating different ones of said plurality of configuration images based upon the existence of a predetermined condition or event.

5. The circuit of claim 1, wherein activating said different ones of said configuration images results in different values being loaded in configuration registers included the circuit.

6. The circuit of claim 1, wherein said configuration images further comprise:
   parameterization data for defining parameters for said component;
   application program interface (API) information for defining an operation of said component; and
   user code for defining functionality of said component.

7. The circuit of claim 1, wherein a first configuration image and a second configuration image include a copy of the same user program.

8. The circuit of claim 1, wherein a first configuration image and a second configuration image include pointers that point to a user program and relevant information from the user program is loaded into the configuration registers when the respective image is activated.

9. An electronic device dynamic configuration method comprising:
   loading a plurality of configuration images a memory of said electronic device including user module personalization data for defining the functionality and configuration of a component included in said electronic device;
   configuring said electronic device in accordance with a first configuration image;
   performing functions in accordance with said first configuration image;
   automatically reconfiguring said electronic device in accordance with a second configuration image; and
   executing functions in accordance with said second configuration image, wherein said reconfiguring of said electronic device in accordance with a second configuration image is performed in response to a predetermined condition or event.

10. The electronic device dynamic configuration method of claim 9 wherein said electronic device is a programmable integrated circuit.

11. The electronic device dynamic configuration method of claim 9 wherein said first configuration image and said second configuration image define different functions and configurations for components of said electronic device.

12. The electronic device dynamic configuration method of claim 9 wherein each of said first configuration image and said second configuration image includes information associated with selections of users modules for each one of the plurality of configuration images, allocations of hardware resources of said electronic device to the selected user modules, parameterizations for the selected user modules, and connections between the selected user modules and to other electronic device components.

13. The electronic device dynamic configuration method of claim 9 wherein said first configuration image is associated with functions directed at normal or standard activities of a particular application and said first configuration image is automatically loaded into configuration registers included in said electronic device.

14. The electronic device dynamic configuration method of claim 9 wherein said second configuration image is associated with functions directed at special activities of a particular application and said second configuration image is automatically loaded into configuration registers included in said electronic device.

15. A method of programming an electronic device comprising:
   a) selecting a set of user modules for a first circuit design system from a plurality of user modules;
   b) allocating hardware resources of said electronic device to said set of user modules;
   c) parameterizing said set of user modules;
   d) connecting said set of user modules together and to external pins of said electronic device;
   e) generating a first configuration image based on a user source program and based on information from said a)–d), said configuration image to be loaded into said electronic device and making said first configuration image active in said electronic device to realize said first circuit design system in said electronic device;
   f) repeating a)–e) for a second circuit design system to produce a second configuration image; and in response to a condition, making said second image active in said electronic device active to dynamically realize said second circuit design system in said electronic device.

16. A method as described in claim 15 further comprising:
   downloading said first configuration image into a memory space of said electronic device; and
   downloading said second configuration image into another memory space of said electronic device.

17. A method as described in claim 15 wherein said electronic device is a programmable microcontroller comprising programmable analog and digital resources.

18. A method as described in claim 15 wherein said a)–e) are performed by a software design tool operable on a general purpose computer system.

* * * * *